United States Patent
Blaesing et al.

(10) Patent No.: US 7,855,353 B2
(45) Date of Patent: Dec. 21, 2010

(54) VEHICLE WINDOW CAMERA ARRANGEMENT HAVING CAMERA WITH CAMERA PORTIONS HANDLING SEPARATE IMAGE AND INTENSITY ACQUISITION FUNCTIONS USING SAME LIGHT-GUIDING ELEMENT PORTION

(75) Inventors: Frank Blaesing, Werl (DE); Matthias Richwin, Dortmund (DE); Ralf Boebel, Holzwickede (DE); Thomas Weber, Ludenscheid (DE); Gregor Boehne, Castrop-Rauxel (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 78 days.

(21) Appl. No.: 12/215,977

(22) Filed: Jul. 1, 2008

(65) Prior Publication Data
US 2008/0283782 A1 Nov. 20, 2008

Related U.S. Application Data

(63) Continuation-in-part of application No. PCT/EP2007/001899, filed on Mar. 6, 2007.

(30) Foreign Application Priority Data

Mar. 8, 2006 (DE) .................. 10 2006 010 671

(51) Int. Cl.
*G02B 6/42* (2006.01)
*H01L 27/00* (2006.01)
(52) U.S. Cl. ................ 250/227.25; 250/208.1
(58) Field of Classification Search ............. 250/208.1, 250/221, 573–577, 227.25; 340/601–604; 73/29.01
See application file for complete search history.

(56) References Cited

U.S. PATENT DOCUMENTS

| | | | |
|---|---|---|---|
| 5,498,866 A | * | 3/1996 | Bendicks et al. ........ 250/227.25 |
| 5,898,183 A | * | 4/1999 | Teder .......................... 250/574 |
| 6,376,824 B1 | * | 4/2002 | Michenfelder et al. .. 250/214 R |
| 7,309,873 B2 | * | 12/2007 | Ishikawa ..................... 250/574 |
| 7,322,755 B2 | | 1/2008 | Neumann et al. |
| 7,348,586 B2 | * | 3/2008 | Ishikawa et al. ............ 250/573 |

(Continued)

FOREIGN PATENT DOCUMENTS

DE      103 26 854 A1    12/2004

(Continued)

*Primary Examiner*—Que T Le
*Assistant Examiner*—Pascal M Bui-Pho
(74) *Attorney, Agent, or Firm*—Brooks Kushman P.C.

(57) ABSTRACT

A camera arrangement includes a camera, a light source, and a light-guide which are in an inside region separated from an outside region by a window. The camera and the light source are pointed at the window. The light-guide is between the camera and the window and between the light source and the window. The light-guide couples light incident to the window from the outside region towards a portion of the camera. The light-guide couples light from the light source into the window which is reflected at the interface between the window and the outside region and couples the reflected light towards another portion of the camera. The camera records an image indicative of the incident light from the outside region through the light-guide and records an intensity of the reflected light from the light source through the light-guide.

18 Claims, 2 Drawing Sheets

U.S. PATENT DOCUMENTS

2004/0200948 A1 10/2004 Bos et al.
2007/0041725 A1 2/2007 Neumann et al.

FOREIGN PATENT DOCUMENTS

| DE | 10 2004 024 018 A1 | 6/2005 |
| DE | 103 55 205 A1 | 7/2005 |
| DE | 10 2004 015 040 A1 | 10/2005 |
| DE | 10 2004 028 735 A1 | 12/2005 |
| EP | 1 536 204 A1 | 6/2005 |
| EP | 1 580 092 * | 9/2005 |

* cited by examiner

VEHICLE WINDOW CAMERA ARRANGEMENT HAVING CAMERA WITH CAMERA PORTIONS HANDLING SEPARATE IMAGE AND INTENSITY ACQUISITION FUNCTIONS USING SAME LIGHT-GUIDING ELEMENT PORTION

CROSS-REFERENCE TO RELATED APPLICATIONS

This is a continuation-in-part of International Application PCT/EP2007/001899, published in German, with an international filing date of Mar. 6, 2007, which claims priority to DE 10 2006 010 671.7, filed Mar. 8, 2006; the disclosures of which are both hereby incorporated by reference.

BACKGROUND OF THE INVENTION

1. Field of the Invention

The present invention relates to a camera arrangement having a camera and a light-guiding element in which the camera records an image of the region outside of a vehicle window, the light-guiding element couples radiation from a light source into and out of the window, and the camera records the intensity of the radiation reflected from the window.

2. Background Art

A camera arrangement may have an image (picture) acquisition function and an intensity acquisition function. The image-acquisition function provides a visual representation of the surrounding area and the intensity-acquisition function can be used to provide an optical moisture sensor (i.e., a rain sensor).

DE 10 2004 015 040 A1 describes a camera arrangement having a camera that records an image of the region outside of a vehicle window. The camera arrangement further includes inward and outward coupling elements located on the inner side of the window. The inward coupling element couples light from a light source into the window in order to provide a rain sensor function. The light is reflected a plurality of times inside the window, and is then coupled away from the window through the outward coupling element toward a part of the camera that is not provided for image acquisition. A screen prevents this part of the camera from receiving light from the outside region.

SUMMARY OF THE INVENTION

An object of the present invention is a camera arrangement that provides an image acquisition function and an intensity acquisition function while having a particularly simple design and an improved manner of operation.

Another object of the present invention is a camera arrangement having a camera and a light-guiding element in which the camera records an image of the region outside of a window through the light-guiding element to thereby provide an image acquisition function, the light-guiding element couples radiation from a light source into the window and couples the radiation reflected from the window out to the camera, and the camera records the intensity of the radiation reflected from the window to thereby provide an intensity acquisition function.

A further object of the present invention is a camera arrangement having a camera and a light-guiding element in which the camera detects incident light from the region outside of a window through the light-guiding element which impinges on one portion of the camera to thereby provide an image acquisition function and detects light reflected by the window through the light-guiding element which impinges on a different portion of the camera to thereby provide an intensity acquisition function.

In carrying out the above objects and other objects, the present invention provides a camera arrangement having a camera, a light source, and a light-guiding element. The camera is separated from a window which divides an outside region from an inside region. The camera is in the inside region and is pointed at the window. The light source is in the inside region and is pointed towards the window. The light-guiding element is in the inside region between the camera and the window and between the light source and the window. The light-guiding element couples light incident to the window from the outside region towards a portion of the camera. The light-guiding element couples light from the light source into the window which is reflected at the interface between the window and the outside region and couples the reflected light towards another portion of the camera. The camera records an image indicative of the incident light from the outside region through the light-guiding element and records an intensity of the reflected light from the light source through the light-guiding element.

A camera arrangement in accordance with embodiments of the present invention includes a camera and a light-guiding element in which the camera records an image of the region outside of a window through the light-guiding element and records the intensity of light reflected from the window through the same light-guiding element.

That is, a camera arrangement in accordance with embodiments of the present invention includes a camera and a light-guiding element in which the light-guiding element serves, in contrast to the background art, as the inward and outward coupling elements for a light intensity acquisition function of the camera and simultaneously forms a part of the lens for the image acquisition function of the camera.

The camera arrangement can separate the acquisition regions of the camera sensor for image acquisition and intensity acquisition camera functions without further effort. A screen is not needed to protect against scattered light for the intensity acquisition function. In addition, the light-guiding element enables an improved inward coupling of the light into the window and thus improved moisture detection.

DETAILED DESCRIPTION OF THE PREFERRED EMBODIMENT(S)

Figure 1:
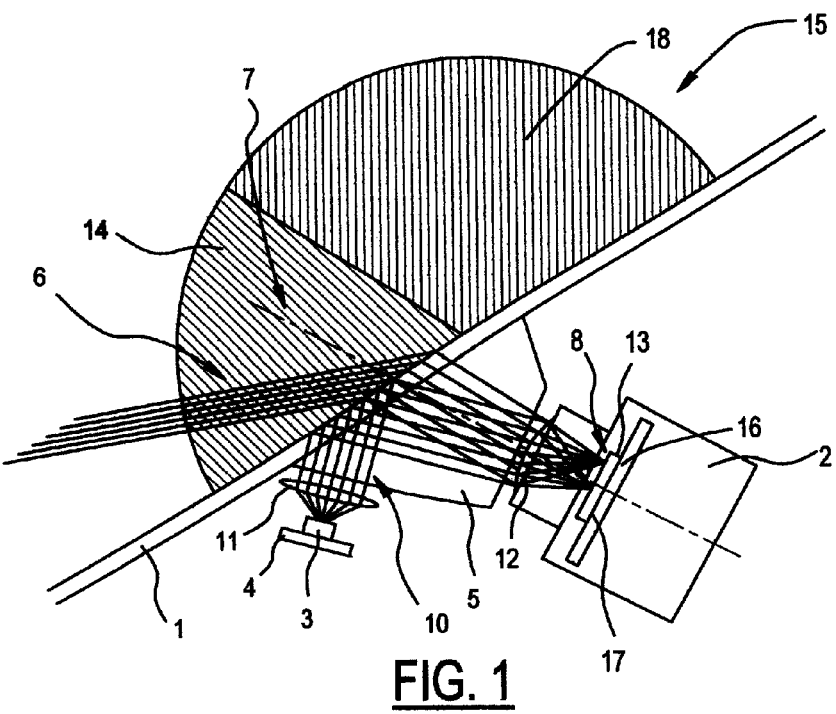
FIG. 1 illustrates a camera arrangement in accordance with an embodiment of the present invention.

Referring now to FIG. 1, a camera arrangement in accordance with an embodiment of the present invention is shown. The camera arrangement is for use with a vehicle. The camera arrangement includes a camera 2 pointed at a vehicle window 1 such as a windshield. The camera arrangement is located on the inner side of window 1 (i.e., the camera arrangement is located in the vehicle). Window 1 is inclined relative to camera 2 with camera 2 having a viewing direction through window 1 into an outside region 15 of window 1 along an optical axis 7. Camera 2 implements a combined image acquisition function and an intensity acquisition function.

The camera arrangement further includes a light-guiding element 5. Light-guiding element 5 couples camera 2 to window 1. To this end, an outer surface of light-guiding element 5 is coupled to the inner side of window 1. Camera 2 is connected with the section of light-guiding element 5 opposite window 1. Parts of light-guiding element 5 can advantageously integrally form part of camera lens 12.

Light-guiding element 5 has the same or similar index of refraction as window 1. For instance, light-guiding element 5 is made of the same material as window 1 such that light-guiding element 5 and window 1 have the same or similar index of refraction. As a result, the camera arrangement has a nearly refraction-free passage of light from window 1 to light-guiding element 5 and camera 2. Light-guiding element 5 can be formed as a rigid prism element or as a tube filled with an optically transparent material.

Camera 2 includes an internal camera chip 13 (i.e., an image acquisition sensor). The surface of camera chip 13 forms an imaging plane 8 of camera 2. Imaging plane 8 of camera 2 lies in the focal plane of camera lens 12, causing camera 2 to be focused (in theory) towards infinity. As such, a beam of parallel light rays 10 reflected from window 1 through light-guiding element 5 toward camera 2 are imaged at an image point 16 of imaging plane 8. Likewise, a beam of parallel light rays 6 incident through window 1 through light-guiding element 5 toward camera 2 are imaged at a different image point 17 of imaging plane 8.

The camera arrangement further includes a light source 3. Light source 3 is implemented as an infrared LED and is located on the lower side of light-guiding element 5. Light source 3 generates light for generating light rays 10. A lens 11 between light source 3 and the lower side of light-guiding element 5 converts the light from light source 3 into light rays 10. Lens 11 can be formed integrally with the lower side of light-guiding element 5. Light rays 10 are coupled through the lower outer surface of light-guiding element 5 and pass through light-guiding element 5 into window 1 without refraction. Light rays 10 pass through light-guiding element 5 into window 1 at an angle that is larger than the limiting angle for total internal reflection. Light rays 10 are then guided by simple total reflection from window 1 in the direction of camera lens 12 of camera 2.

If moisture or rain is present on window 1, then a portion of light rays 10 coupled by light-guiding element 5 into window 1 is coupled out of window 1 into outside region 15 of window 1. As a result, the component of light rays 10 totally reflected in the direction of camera 2 is diminished. The intensity of light rays 10 received by camera 2 is correspondingly diminished compared to the intensity received by camera 2 in the case of a dry window 1. Camera 2 can thereby detect a moistening of window 1 and thus forms a condensation or rain sensor.

As such, a region of window 1 is illuminated by light rays 10 from lens 11 and light source 3 so that moisture can be detected on window 1. The larger the illuminated region of window 1, then the larger the probability that a rain drop on window 1 will be detected. At the same time, the change in signal caused by a single rain drop is diminished. Thus, a plurality of light sources 3 may be used with one or more lenses 11. Light sources 3 are then displayed in different pixel groups of camera chip 13. A sufficiently large illuminated region of window 1 is thereby obtained as well as a sufficiently large change in signal as moisture appears.

The illumination region of light source 3 on window 1 can thus even intersect the region of window 1 through which the image of outside region 15 of window 1 is recorded by camera 2. As further described below, the two functions (i.e., the image acquisition function and the intensity acquisition function) of camera 2 do not interfere with one another.

Alternatively, convergent or divergent light from light source 3 instead of the beam of parallel light rays 10 can be coupled into light-guiding element 5. Consequently, light totally reflected from window 1 reaches camera 2 at different angles thereby causing image point 16 to expand accordingly in image plane 8 of camera 2.

Camera 2 records light incident from outside region 15 of window 1 as an image. FIG. 1 illustrates the field of view 14 of camera 2 as a first hatched area. Optical axis 7 of camera 2 intersects field of view 14. Light-guiding element 5 causes the light deflection produced by refraction through window 1 to persist due to the refraction-free coupling at window 1. This results in field of view 14 of camera 2 in outside region 15 of window 1 with the detection region of camera 2 including light that is incident at least from a grazing direction on window 1.

In FIG. 1, the path of the beam of light rays 6 incident on window 1 from outside region 15 of window 1 is shown. Light rays 6 are incident on window 1 at an angle. Light rays 6 are refracted at window 1 to be at an angle normal to window 1. Light rays 6 continue to propagate in a straight line through light-guiding element 5 toward camera 2 and are imaged through camera lens 12 at image point 17 of imaging plane 8. The totality of light rays 6 incident from outside region 15 is collected into an image 19 of outside region 15 in imaging plane 8 of camera 2.

The lateral position of image point 17 in imaging plane 8 thus depends on the direction of incidence of light rays 6. The detection region of camera 2 can thereby be large enough so that the entire field of view 14 is imaged on one portion of the optical sensor surface of camera chip 13. It follows from this that even light emanating from an angle beyond grazing incidence can be recorded by camera 2, which corresponds to light incident from the inner side of window 1.

This additional angular region that can be viewed through camera 2 is used here by light source 3 for implementing the moisture sensor. Because the incident beam angle of light source 3 is added to the angular region formed by the external field of view 14, the imaging region of light source 3 also connects laterally to the imaging region of outside region 15 of window 1 without overlapping in imaging plane 8 of camera 2.

Advantageously, both regions are recorded by different camera 2 adjustments. In a first image, the camera adjustments are optimally set for recording outside region 15 thereby excluding light source 3. Thus any light scattering caused by light source 3 cannot disturb the recording by camera 2 of outside region 15. In a second image, light source 3 is switched to very bright and camera 2 adjustments are matched to this high brightness level. Any scattered light originating from the possibly very bright outside region 15 can then have only an insignificant effect when camera 2 detects light from light source 3.

Figure 2:
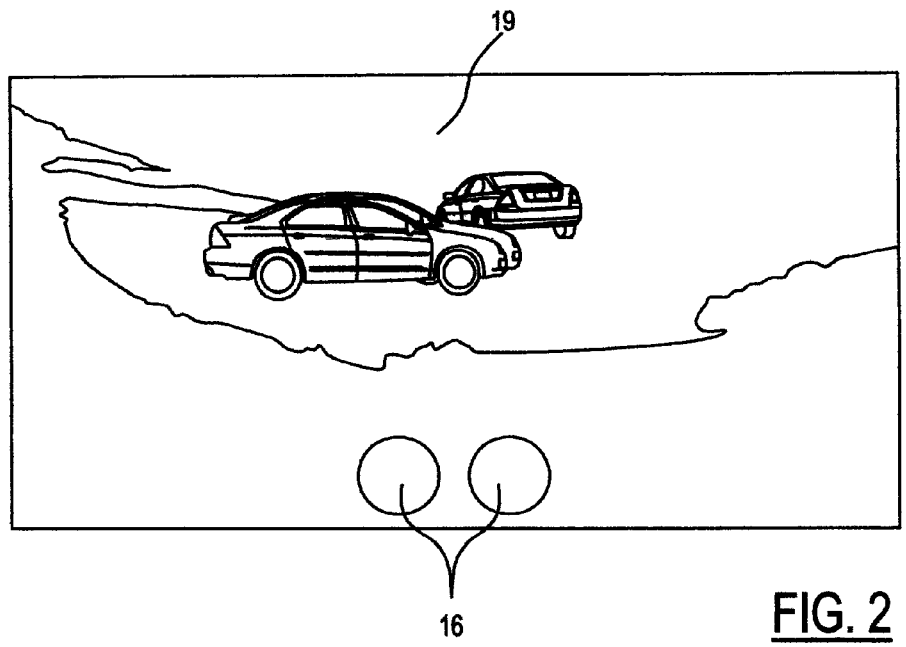
FIG. 2 illustrates an image taken by the camera arrangement.

This clarifies the exemplary camera image shown in FIG. 2, which had to be reduced to a black and white image for printing purposes. An actual camera image represented at least by gray levels provides richer detail than the diagrammatic sketch shown here. In the upper region of the camera image, image 19 of outside region 15 of window 1 recorded by camera 2 is shown. In the lower region of the camera image, the somewhat broadened image points 16 of two light sources 3 are shown. Image points 16 are evaluated with respect to their intensity or changes in intensity by an evaluation device. Such an evaluation device can be a component of camera 2 and may be used to control a windshield wiper system, for example.

Image 19 of outside region 15 exhibits distortion caused by light-guiding element 5. This image distortion can be compensated by an evaluation device for displaying recorded image 19.

Figure 3:
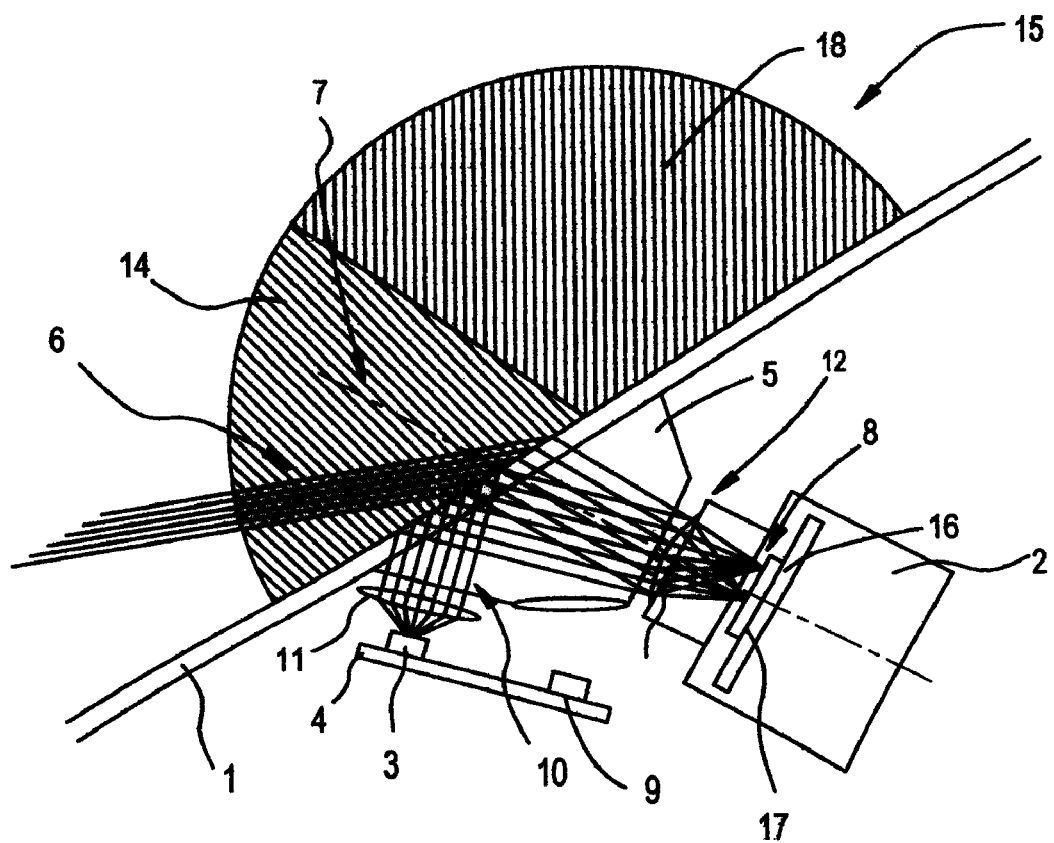
FIG. 3 illustrates a camera arrangement in accordance with another embodiment of the present invention.

As described, the imaged acquisition of outside region 15 is limited to the field of view 14 of camera 2. No light is able to reach camera 2 through window 1 from adjacent section 18 of outside region 15. As shown in FIG. 3, however, light from section 18 of outside region 15 can be guided through light-guiding element 5 onto an additional optical sensor 9 that records the brightness of section 18 of outside section 15 as an ambient light sensor 9.

Ambient light sensor 9 along with light source 3 are located on a common circuit mount 4. Preferably, light source 3, circuit mount 4, and/or ambient light sensor 9 together with light-guiding element 5 are combined into a single structural unit.

REFERENCE NUMBERS

1 Vehicle window
2 Camera
3 Light source
4 Circuit mount
5 Light-guiding element
6 Beam of light rays
7 Optical axis
8 Imaging plane
9 Ambient light sensor
10 Beam of light rays (from the light source)
11 Lens
12 Camera optics
13 Camera chip
14 Field of view
15 Outside region
16 Image point
17 Image point
18 Section (of the outside region)
19 Image (of the outside region)

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A camera arrangement comprising:
a camera separated from a window which divides an outside region from an inside region, wherein the camera is in the inside region such that a space is between the camera and the window and the camera is pointed at the window along an optical axis of the camera with the window being inclined relative to the optical axis such that light incident to the window from the outside region is refracted only once at the interface between the window and the outside region in a direction at least generally parallel with the optical axis and directed within the window towards the camera, wherein different non-overlapping first and second portions of the camera lie alongside one another in an imaging plane of the camera;
a light source separated from the window, wherein the light source is in the inside region such that a space is between the light source and the window and the light source is pointed towards the window; and
a light-guiding element composed of a solid, optically transparent material having a refraction index substantially similar to the refraction index of the window, wherein the light-guiding element is in the inside region and fills the spaces between the camera and the window and between the light source and the window with an end portion of the light-guiding element being adjacent to the camera and with the first and second portions of the camera being normal to the end portion of the light-guiding element, wherein the light-guiding element couples the refracted incident light out of the window through the end portion of the light-guiding element towards the first portion of the camera such that the refracted incident light passes through the light-guiding element and through the end portion of the light-guiding element to the first portion of the camera, wherein the light-guiding element couples light from the light source into the window which is reflected at the interface between the window and the outside region and couples the reflected light out of the window, without the reflected light either being reflected again at the interface between the window and the outside region or being reflected at the interface between the window and the inside region, through the end portion of the light-guiding element towards the second portion of the camera such that the reflected light passes through the light-guiding element and through the end portion of the light-guiding element to the second portion of the camera;
wherein the first portion of the camera records an image indicative of the refractive incident light through the light-guiding element and through the end portion of the light-guiding element and the second portion of the camera records an intensity of the reflected light through the light-guiding element and through the end portion of the light-guiding element.

2. The arrangement of claim 1 wherein:
the light-guiding element and the window are of the same material.

3. The arrangement of claim 1 wherein:
the light-guiding element is a prism.

4. The arrangement of claim 1 wherein:
the light-guiding element is formed by a tube filled with an optically active material.

5. The arrangement of claim 1 wherein:
the light from the light source is a beam of parallel light rays.

6. The arrangement of claim 5 wherein:
the light source includes a lens to generate the beam of parallel light rays.

7. The arrangement of claim 1 wherein:
the light from the light source includes at least one of convergent and divergent light.

8. The arrangement of claim 1 wherein:
a field of view of the image recording function of the camera and the reflection region of the intensity recording function of the camera overlap at least partially on the outside of the window.

9. The arrangement of claim 1 wherein:
the camera is focused on a plane lying in the outside region.

10. The arrangement of claim 1 further comprising:
an ambient light sensor independent from the camera.

11. The arrangement of claim 10 wherein:
the ambient light sensor collects light from the outside region through the light-guiding element that does not lie within the field of view of the image recording function of the camera.

12. The arrangement of claim 10 wherein:
the ambient light sensor forms a structural unit with the light source.

13. The arrangement of claim 1 wherein:
the light source and the light-guiding element form a structural unit with one another.

14. The arrangement of claim 1 wherein:
the light-guiding element is mechanically connected with the window.

15. The arrangement of claim 14 wherein:
the light-guiding element is integrally connected with at least one of the window and the camera.

16. The arrangement of claim 1 wherein:
the camera, the light-guiding element, and the light source are combined into one structural unit.

17. The arrangement of claim 1 further comprising:
an evaluation device for equalizing the image recorded by the camera.

18. A camera arrangement comprising:
a camera separated from a window which divides an outside region from an inside region, wherein the camera is in the inside region such that a space is between the camera and the window and the camera is pointed at the window along an optical axis of the camera with the window being inclined relative to the optical axis such that light incident to the window from the outside region is refracted only once at the interface between the window and the outside region in a direction at least generally parallel with the optical axis and directed within the window towards the camera, wherein different non-overlapping first and second portions of the camera lie alongside one another in an imaging plane of the camera;

a light source separated from the window, wherein the light source is in the inside region such that a space is between the light source and the window and the light source is pointed towards the window; and a light-guiding element composed of a solid, optically transparent material having a refraction index substantially similar to the refraction index of the window, wherein the light-guiding element is in the inside region and fills the spaces between the camera and the window and between the light source and the window with an end portion of the light-guiding element being adjacent to the camera and with the first and second portions of the camera being normal to the end portion of the light-guiding element, wherein the light-guiding element couples the refracted incident light out of the window through the end portion of the light-guiding element towards the first portion of the camera such that the refracted incident light passes through the light-guiding element and through the end portion of the light-guiding element to the first portion of the camera, wherein the light-guiding element couples light from the light source into the window which is reflected at the interface between the window and the outside region and couples the reflected light out of the window, without the reflected light either being reflected again at the interface between the window and the outside region or being reflected at the interface between the window and the inside region, through the end portion of the light-guiding element towards the second portion of the camera such that the reflected light passes through the light-guiding element and through the end portion of the light-guiding element to the second portion of the camera.

* * * * *